April 28, 1959   A. WEBER   2,884,499
CONTACTOR
Filed Jan. 7, 1958   6 Sheets-Sheet 1

INVENTOR.
Artur Weber
BY Edward T. Connors
Atty.

April 28, 1959  A. WEBER  2,884,499
CONTACTOR
Filed Jan. 7, 1958  6 Sheets-Sheet 2
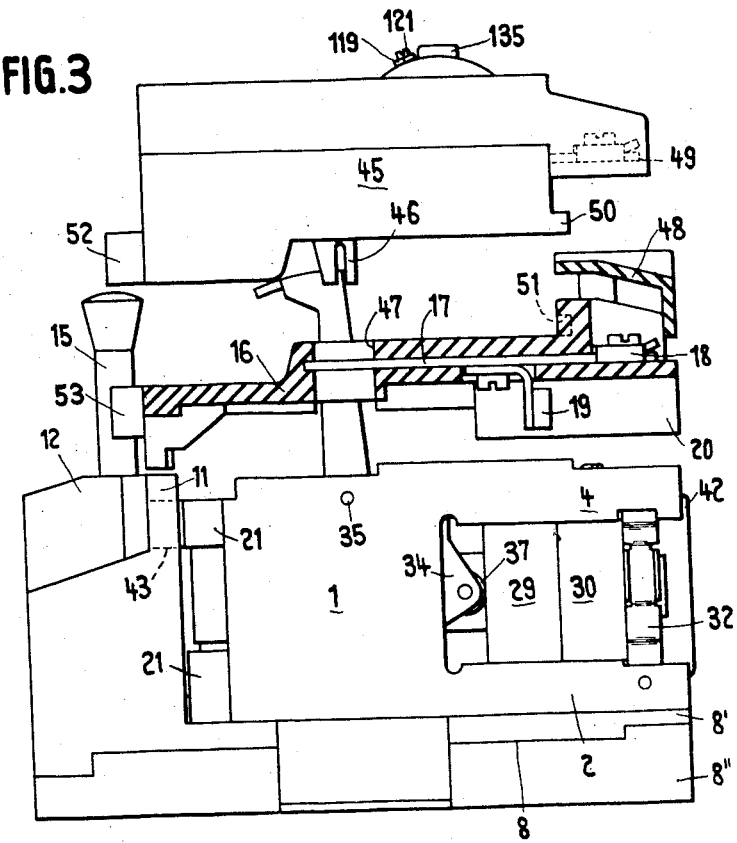
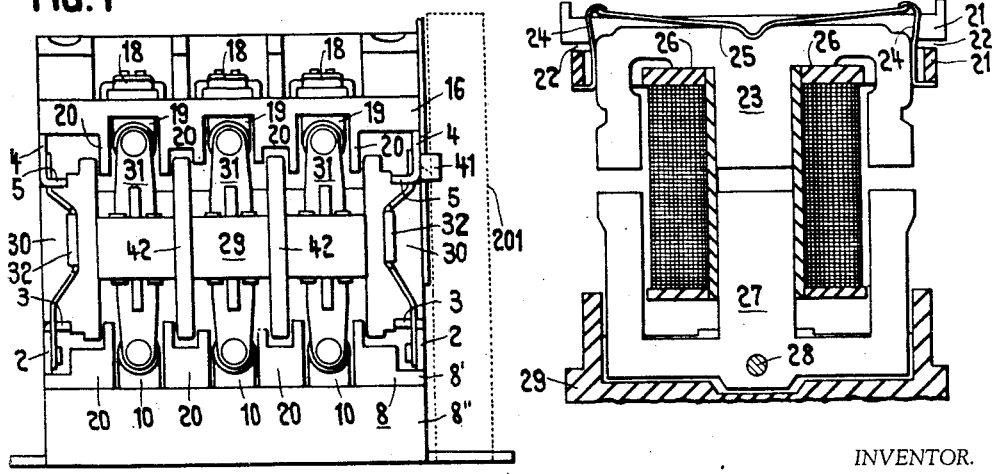
INVENTOR.
Artur Weber
BY Edward F. Connors
Atty.

April 28, 1959    A. WEBER    2,884,499
CONTACTOR

Filed Jan. 7, 1958    6 Sheets-Sheet 3

INVENTOR.
Artur Weber

April 28, 1959     A. WEBER     2,884,499
CONTACTOR

Filed Jan. 7, 1958     6 Sheets-Sheet 4

INVENTOR.
Artur Weber

April 28, 1959  A. WEBER  2,884,499
CONTACTOR
Filed Jan. 7, 1958  6 Sheets-Sheet 5

INVENTOR.
Artur Weber

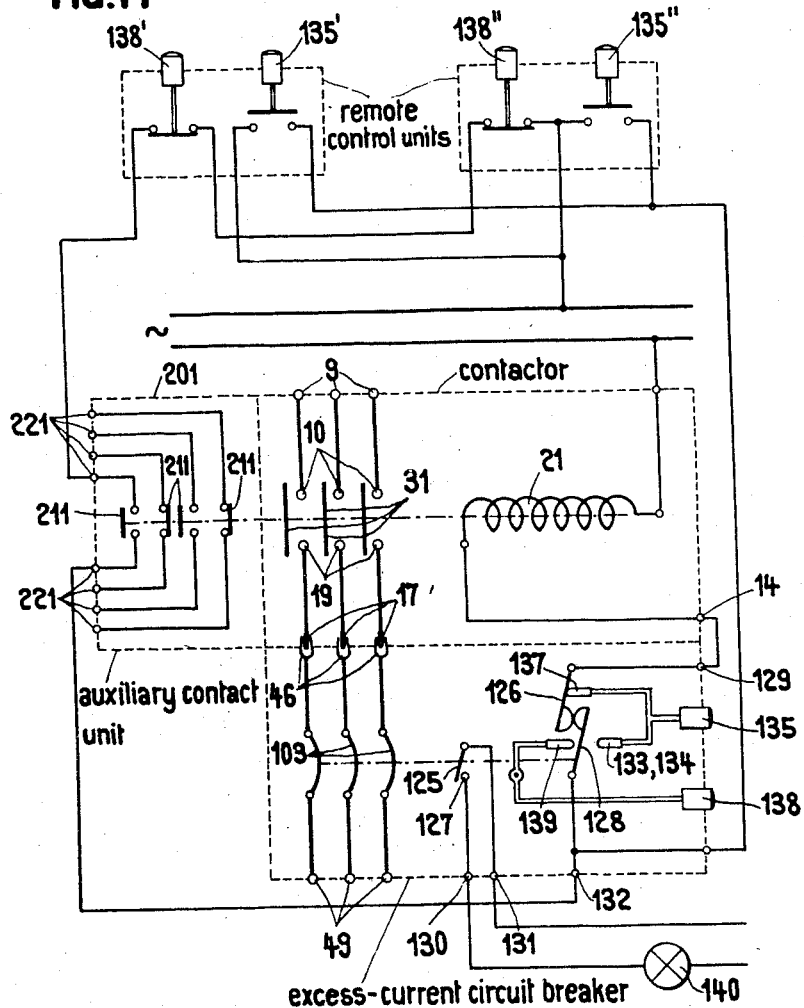

United States Patent Office 2,884,499
Patented Apr. 28, 1959

2,884,499

CONTACTOR

Artur Weber, Muri, near Berne, Switzerland, assignor to Saia A.G., Murten, Switzerland Application January 7, 1958, Serial No. 707,602

12 Claims. (Cl. 200—106)

This invention relates to contactors for controlling electric circuits and more particularly power circuits for electric motors, boilers, heaters and other consumers.

It is a first object of this invention to provide a contactor which is very simple in construction and may easily be assembled and disassembled and which is very simple and reliable in operation. In order to obtain such a simple and reliable assembly, the contactor according to this invention broadly comprises a carrying frame made for instance of sheet metal and having top and bottom portions and side portions, platelike supports for fixed contacts attached to the said top and bottom portions respectively of the said frame, the said side portions of the frame and the said platelike supports enclosing a canal-shaped space, a displaceable support for movable contacts, and guide means in the said frame for the said displaceable support, the said displaceable support being displaceable in the said canal-shaped space thereby being guided in the said guide means of the frame. The frame of sheet metal on one hand makes it possible to guide the displaceable contact carrier between the stationary contact carriers and therefore to dispense with separate guiding or bearing means for the displaceable contact carrier and the frame also forms the mounting structure for the stationary portions of the contactor, particularly the said stationary contact carriers. The same frame may be used for mounting the operating solenoid of the contactor and other parts of the contactor. The displaceable parts and the parts connected into the electrical circuit may be located within the said space enclosed by the frame and the stationary contact carriers so that such parts cannot be touched. Therefore the contactor is very safe in operation and its active parts are well protected in the said space. A separate cover or casing for the contactor is not required.

It is another object of this invention to provide a contactor associated with an excess-current circuit-breaker comprising a tripping device having an operating position and a tripped position, a current measuring device and a pivotable latch lever operatively associated with the said tripping device and controlled by the current measuring device, a normal current position for the said latch lever for which said tripping device is held in its operating position and an excess-current position for the said latch lever for which the said tripping device is released into its tripped position, the said latch lever having a first control surface cooperating with the said current measuring device and a second control surface cooperating with the said tripping device, the said first and second control surfaces executing at least approximately mutually perpendicular motions when the said latch lever is turned by the said current measuring device, an adjusting range for the said latch lever and adjusting means associated with the said latch lever adapted for translatorially displacing the said latch lever in a direction perpendicular to the operating displacement and in the plane of the said first control surface, the angular position of the said latch lever being continuously determined throughout the said adjusting range by the engagement between the said first control surface and the current measuring device. By these means linear adjustment of the tripping current over a wide range is possible due to the novel feature that the latch lever is rotatively displaced by the current measuring device but is not rotatively but translatorially displaced for adjusting the sensitivity of the excess-current tripping device.

It is a further object of this invention to provide a contactor having contacts which may easily and rapidly be adjusted to different positions in order to change the operating characteristics of such contacts. This is possible by providing a contactor having broadly at least one displaceable contact and at least one stationary contact associated with the said displaceable contact, at least one of the said displaceable and stationary contacts respectively being removably and loosely supported in a contact carrier, the said contact and the said contact carrier allowing insertion of the contact in two opposite positions, two different operating characteristics of the contactor being obtained according to whether the contact is in the one or other of its said opposite positions. Such contacts removably and loosely supported in a contact carrier may easily be removed and reinserted in a different position so that the contact assemblies may be manufactured as a standard equipment but may subsequently be adapted as desired for different applications, whereby within certain limits any desired numbers and combinations of breaking contacts or making contacts may be obtained.

Other objects and advantages of the invention will be apparent from the following description and from the accompanying drawings which show, by way of example, an embodiment of the invention.

Fig. 3 is a partially exploded side view of the contactor and of an excess-current circuit-breaking device associated therewith and illustrates the manner in which these apparatus are assembled.

Fig. 4 is an end view of the contactor from the right in Fig. 3.

Fig. 5 is a section through the operating solenoid of the contactor.

Fig. 14 is a circuit diagram illustrating the control circuits of the contactor.

Figure 1:
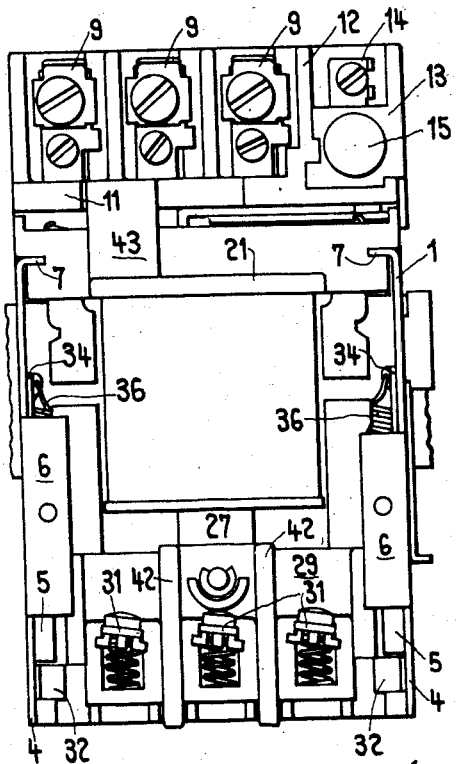
Fig. 1 is a top view of the contactor with its upper contact carrier removed.

The contactor has a generally U-shaped mounting frame 1 made of sheet metal, to which frame the remaining parts of the contactor are attached. The frame has lower projections 2 and upper projections 4 having inwardly directed guide lugs 3 and 5 respectively, one of the upper lugs 5 being shown on the rear projection 4 illustrated in Fig. 2. The side portions of the frame have upper mounting lugs or flanges 6 and rear lugs or flanges 7, also best seen in Fig. 2.

Figure 2:
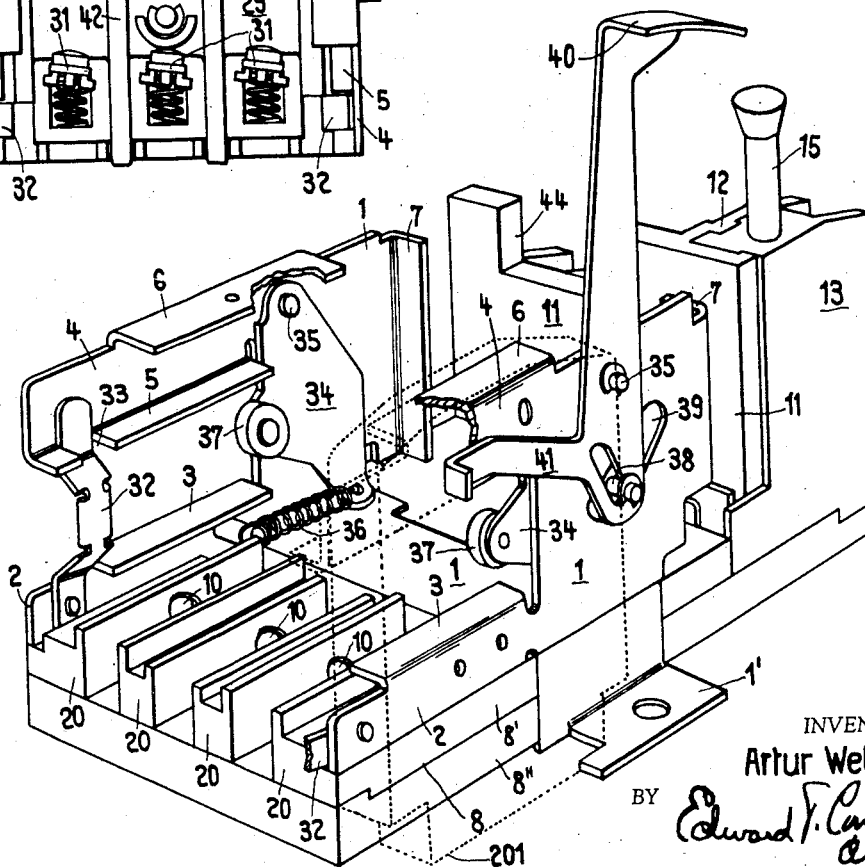
Fig. 2 is a perspective view of the partially disassembled contactor.

A lower contact supporting plate 8 composed of two seperate plate portions 8' and 8" is screwed to the bottom portion shown in horizontal position in Fig. 2 of the frame 1, terminal and contact carrying conductor bars being held in slots formed at the contacting surfaces of plates 8' and 8" in a way not shown in the drawing. Such conductor bars are connected to terminals 9 (Fig. 1) of the contactor with their one end and to stationary contact pieces 10 (Fig. 2 and 4) with their other ends. Of course the contact supporting plate 8 may as well be made of one single piece of plastic insulating material into which the necessary connecting conductors are moulded in a well known manner.

The contact supporting plate 8 and more precisely its upper plate portion 8" has a wall portion 11 shown in vertical position in Fig. 2, this wall portion 11 forming an end plate or mantle portion at the top end of the contactor as seen in Fig. 1, on the right in Fig. 2 and on the left in Fig. 3. A fuse element 13 is inserted between the end wall portion 11 and a profiled flange 12 thereof, the fuse element 13 having terminals 14 for connection of the control circuits for the contactor solenoid, and into which a common circuit-breaking plug 15 is removably inserted.

An upper contact supporting plate 16 similar to the lower contact supporting plate 8 is screwed to the upper mounting lugs 6 (Figs. 1 and 2) of the frame 1, the contact supporting plate 16 being made of an insulating plastic material and connecting conductors 17 (Figs. 3 and 4) carrying terminals 18 and stationary contact pieces 19 being moulded into this upper plate 16. For better illustration the contact supporting plate 16 is shown as being slightly lifted from its normal position in Fig. 3. Spark-arresting separating walls 20 having a cross section as shown in Figs. 2 and 4 are provided on the contact supporting plates 8 and 16 respectively.

The actuating solenoid of the contactor is wound to a coil body 21 having two lateral slots 22 into which the lugs or flanges 7 of the frame 1 engage thereby securing the coil body against axial displacement but allowing easy removal of the coil body from the frame 1 by pulling it out of frame 1 in a direction parallel to the edges of flanges 7. A magnet core 23 is axially displaceably mounted in the coil body 21. Normally the core 23 is maintained in the position illustrated in Fig. 5 by the pressure of a leaf spring 25 anchored on the coil body 21 by means of yokes 24. In this normal position the core 23 rests against the coil body 21 with its shoulders 26. An armature 27 assembled with a contact carrier 29 by means of a pin junction 28 allowing limited relative angular displacement between the armature and the contact carrier is mounted in the coil body 21 for axial displacement. The contact carrier 29 has lateral guide pieces 30 best seen in Fig. 4, the contact carrier being guided between the lugs or flanges 3 and 5 of the frame by means of these guide pieces. Spring loaded contact bridges 31 are removably inserted into the contact carrier 29 in a manner indicated in Figs. 1 and 4 but being without importance for this invention, the contact pieces of such contact bridges being adapted for cooperation with pairs of associated stationary contact pieces 10 and 19 respectively. Stop members 32 of resilient material are pivoted on the lower extensions 2 of frame 1, the free ends of such stop members 32 usually engaging recesses 33 of the upper extensions 4 of the frame 1, thereby preventing the contact carrier 29 from leaving the hollow canal-shaped space enclosed within the frame 1 and the contact supporting plates 8 and 16. Resetting levers 14 loaded by resetting springs 36 and acting onto the contact carrier 29 by means of control rollers 37 are pivoted on rivets 35 attached to frame 1, springs 36 and levers 34 tending to shift the contact carrier 29 into its open or circuit-breaking position for which the contact carrier abuts against the stop members 32 and in which position the contact bridges 31 are separated from the stationary contacts 10 and 19 respectively. The resetting lever 34 shown on the right in Fig. 2 has a control pin 38 projecting through a slit 39 of the frame 1 and engaging a slit of an indicating and control lever having an arm carrying a surface 40 indicating the operating position of the contactor and another arm 41 for control of a group of further contacts, for instance auxiliary contacts connected into the control circuits of the contactor and located in a casing 201 indicated in dotted lines in Figs. 2 and 4 and further shown in detail in Figs. 10 to 13.

The contact carrier 29 has flanges 42 engaging slots of the separating walls 20, spark arrester chambers for the main contacts (31, 10, 19) being formed between the flanges 42, the guide pieces 30 and the separating walls 20 respectively.

The coil body 21 has an extension 43 engaging a recess 44 of the wall 11 so that the face of the projection 43 may be seen from outside when the contactor is completely assembled. This face may be labeled with indications for instance on the operating voltage and power consumption of the actuating solenoid of the contactor and therefore a separate label at another place of the contactor may be dispensed with. Since the label is provided on the coil body itself it is practically impossible that the indications of the label do not correspond to the physical data of the coil inserted in the contactor and therefore damage or improper operation of the contactor is avoided.

The contactor as far as described above operates as follows: When the contactor solenoid is energized the armature 27 with the contact carrier 29 is pulled into the solenoid until it abuts against the core 23. Upon this movement of the contact carrier the contact bridges 31 which have been held in open position are brought into contact with the stationary contact pieces 10 and 19 respectively thereby closing the main contactor circuits from the terminals 9 to the terminals 18. Simultaneously the resetting levers 34 are rotated against the action of springs 36 in anticlockwise direction in Fig. 1. When the armature 27 impinges onto the core 23 the latter is pushed upwardly in Fig. 5 against the pressure of leaf spring 25, until the kinetic energy of the armature 27 is absorbed, whereafter the leaf spring 25 resets the core 23 and the armature 27 to a position as shown in Fig. 5 for the core 23. With this resilient suspension of the magnet core 23 the contactor operation is free from shocks and thumping or click. During the closing motion of the contactor the control and indicating lever is driven by the pin 38 of the resetting levers 34 in anticlockwise direction in Fig. 2, whereby the indicating face 40 is displaced into a position characterizing closed position of the contactor and whereby the said set of auxiliary contacts or other auxiliary apparatus controlled by the contactor are actuated by the control arm 41 in a manner described later on. When the contactor solenoid is deenergized the armature 27 and the contact carrier 29 are moved downwardly in Fig. 1 by the resetting springs 36 and resetting levers 34 respectively into a rest position determined by the stop members 32, the main contacts being opened during this opening motion of the contactor.

If the contact carrier 29 is required to be removed from the contactor, for instance in order to replace worn contact bridges 31, the stop members 32 are bent inwardly by inward pressure onto such members until they leave the recesses 33 and may be swung downwardly to an inoperative position as indicated on the right side of the contactor in Fig. 2. The contact carrier 29 may now be removed without difficulty because it had been loosely inserted between the stop members 32 and the spring loaded resetting rollers 37. By reversed order of the operations the contact carrier with the armature fixed thereto may be reinserted into the contactor in a very simple manner.

Replacing of a damaged contactor solenoid or a solenoid which does not match with the control voltage is very simple. First the contact carrier 29 with the armature is removed in the manner set out above, whereafter the contact-supporting plate 16 is removed after having loosened two screws by means of which the contact-supporting plate has been fixed to the frame 1. The coil body with the magnet core 23 attached to it may now be lifted out of the contactor. Another solenoid with a core 23 and a leaf spring 25 already attached to it may now be inserted between the supporting lugs 7 of the frame 1, whereby contact members of the coil body 21 engage suitable stationary contact members at the bottom contact supporting plate 8 whereby the solenoid is connected to its control circuit. After having screwed the upper contact-supporting plate 16 to the frame 1 and having inserted the contact carrier 29 and the magnet armature 27 the contactor is ready for further operation.

The contactor may be used in any desired position, whereby it is fixed to a supporting base, for instance a switch and distribution board not shown in the drawing, by means of screws inserted through fixing holes in lateral mounting lugs 1' of the frame 1. However, it is preferred to arrange the contactor in such a position that the contact carrier 29 moves in a vertical direction in which case no or very little friction occurs at the guide surfaces of the contact carrier and therefore minimum wear of such guide surfaces is obtained.

Of course the fuse element 13 with the circuit-breaking plug 15 may be omitted or replaced by any suitable other member. When the fuse element 13 is omitted the back wall 11 may completely be replaced by a suitably shaped flange of the coil body 21. A canal-shaped hollow space is formed in the contactor between the frame 1 and the contact supporting plates 8 and 16, forming a casing for the displaceable contact carrier 29, the ends of the said hollow space being limited by the contactor solenoid and by the contact carrier respectively. With this arrangement a very simple and space-saving construction of the contactor is rendered feasible, whereby the external delimitation of the contactor is completely formed by active portions of the contactor, viz. the mounting frame 1, the contact supporting plates 8 and 16, the contactor solenoid and the displaceable contact carrier 29.

Assembling of the contactor only requires two screw fastenings for attaching the contact supporting plates 8 and 16 to the frame 1 so that the contactor may be manufactured with very little labour and may easily be disassembled and reassembled for maintenance.

Since the contact-supporting plates 8 and 16 of the contactor are easily and directly accessible, the contactor is particularly suited for being coupled with auxiliary equipment such as excess-current circuit breakers and the like. In Fig. 3 an excess-current circuit breaker 45 is schematically indicated in side view. This excess-current circuit breaker is more fully illustrated in Figs. 6 to 9 and has three sets of spring contact plugs 46 adapted to be introduced into three apertures 47 of the upper contact supporting plate 16 when the excess-current circuit breaker is put onto the contactor from the spaced position shown in Fig. 3. Thereby the contact springs 46 engage the connecting rods 17 extending through the apertures 47 of the contact supporting plate 16. When the excess-current circuit breaker 45 is assembled with the contactor terminals 18 of the latter are covered by means of a cover 48 of insulating material and the main circuit controlled by contacts 10, 19 and 31 of the contactor are connected to terminals 49 indicated in dotted lines in Fig. 3 of the excess-current circuit breaker, so that the main circuits now comprise terminals 9, main contacts 10, 31 and 19, connecting bar 17, contact springs 46, the excess-current circuit breaker 45 and terminals 49 of the latter. In a manner described later on the excess-current circuit breaker supervises the control circuit of the contactor solenoid thereby causing opening of the contactor when an excess current occurs due to a failure of the consumer. In order to obtain a reliable mechanical connection between the excess-current circuit breaker and the contactor the excess current circuit breaker has lugs 50 adapted to engage recesses 51 of the upper contact supporting plate 16 and a screw connection is formed at projections 52 and 53 of the excess-current circuit breaker and the contactor respectively.

Figure 7:
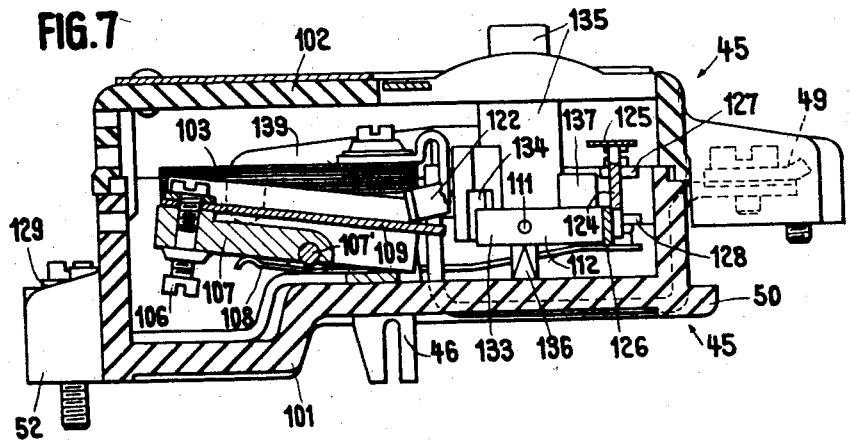
Fig. 7 is a section along line VII—VII in Fig. 6.

The excess-current circuit breaker has a casing of insulating material, comprising a base portion 101 and a cover 102 as best seen in Fig. 7, bimetallic releasers 103 of conventional type being fixed in the bottom portion 1 and electrically connected between terminals 49 and spring plugs 46. The free ends of the bimetallic releasers 103 are adapted to cooperate with screws 106 (Figs. 7 and 9) adjustably inserted into a rocker pivoted in the casing by means of a pivot pin 107'. A leaf spring 108 continuously acts onto the rocker 107 tending to turn it in a clockwise direction in Fig. 7 and thereby to maintain screws 106 in contact with the bimetallic releasers 103 associated therewith. The screws 106 are so adjusted that each of them contacts the bimetallic releaser 103 associated with it when the bimetallic releasers are in cold state and there is no current flow in them. A bimetal strip 109 is screwed to one end of the rocker 107, the said bimetal strip cooperating with the tripping mechanism illustrated in detail in Figs. 8 and 9. The bimetal strip 109 compensates the influence of the ambient temperature on the bimetallic releasers 103.

The tripping mechanism mentioned above has a U-shaped mounting structure 110 screwed to the one side wall of the bottom portion 101 of the casing, a U-shaped releasing part 112 being pivoted with its legs within the mounting structure 110 by means of a pivot pin 111. One end of a torsion spring 113 is attached to the releasing part 112, the other end of this spring being anchored on the mounting part 110, and the spring tending to rotate the releasing portion 112 in anticlockwise direction in Fig. 8. However, for the condition of the tripping mechanism shown in Fig. 8, in which condition the tripping mechanism is charged and is ready to operate on occurrence of an excess current, rotation of the releasing part 112 under the action of spring 113 is opposed by the lower control face of a U-shaped arm 14 of a latch lever. This latch lever has a pivot pin 15 engaging straight horizontal slits 116 of the stationary mounting structure 110 and curved slits 117 of an adjusting member 118 respectively, the adjusting member 118 being pivoted on the pivot pin 111. The adjusting member 118 has a pointer 119 running along a curved scale 120 fixed on the stationary mounting structure 110 when the adjusting member 118 is turned on its pivot pin 11. The pointer 119 has a set screw 121 by means of which the pointer and the adjusting member respectively may be locked in any desired adjusting position. The said latch lever has a control arm 122 arranged at a right angle to its arm 114, a control face 122' of the control arm 122 being continuously held in contact with the upper control face of the bimetal strip 109 under the action of a spring 123 of which opposite ends are anchored on the latch lever and on the mounting structure 110 respectively.

A control member 124 of insulating material attached to the releasing part 112 cooperates with contact springs 125 and 126. As may be seen in Fig. 7 the upper contact spring 125 belongs to a pair of making contacts 125, 127 while the lower contact spring 126 belongs to a pair of rest contacts 126, 128. Contact spring 126 is electrically connected to a terminal 129 in a manner not fully illustrated, whereas contact springs 125, 127 and 128 are electrically connected to terminals 130, 131 and 132 respectively.

Figure 6:
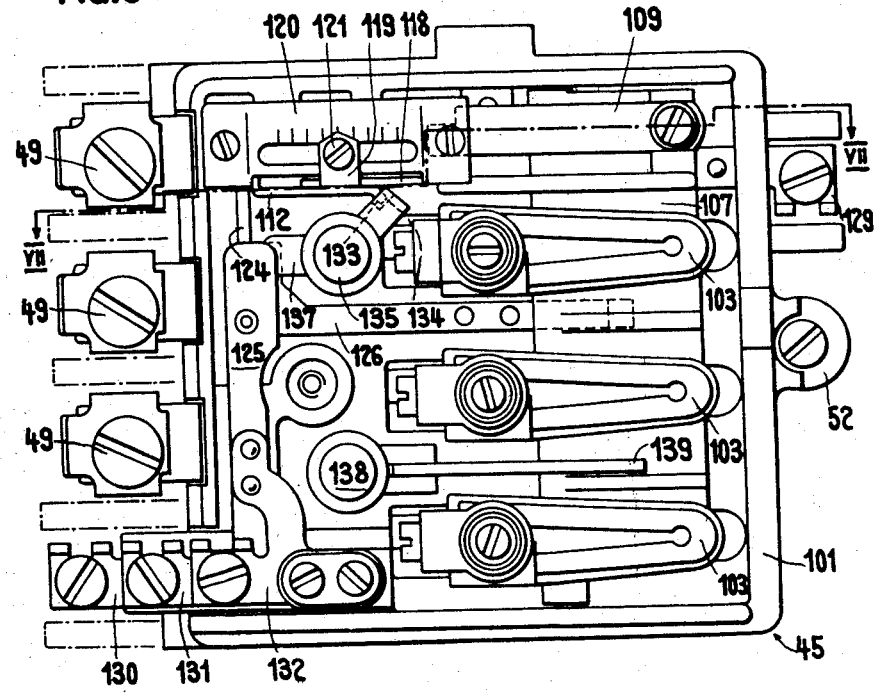
Fig. 6 is a general top view of the excess-current circuit-breaking device with the cover removed.

The releasing part 112 has a lateral extension 133 at its leg situated outside the mounting structure 110, the said extension 133 engaging a recess 134 of a start pressure button 135 as shown in Figs. 6 and 7, the said start button 135 having a carrier 136 of rectangular cross section (Fig. 7). The start push button is usually held in its inoperative upper position shown in the drawing by spring action but may be pushed down into an operative position against this spring action. The start button 135 has a projection 137 adapted to engage the contact spring 126 thereby opening the rest contacts 126, 128 whenever the start button is depressed.

By means of a further carrier similar to carrier 136 but not shown in the drawing, a stop pressure button 138 is mounted in the base portion 101 of the casing for vertical displacement but secured against rotation, this stop button having an arm 139. When the stop button 138 is depressed against spring action its arm 139 engages and rotates the rocker 107 in an anticlockwise direction in Fig. 7, whereby the screws 106 of the rocker leave the lower control faces of the bimetallic releasers 103.

Fig. 14 shows, by way of example, a circuit adapted for remote control from two places and local control of the contactor equipped with the excess-current circuit breaker, the parts of the contactor and of the excess-current circuit breaker being schematically shown in Fig. 14 but designated with the same reference numerals as in Figs. 1 to 9. It is believed that Fig. 14 is self-explanatory in view of the foregoing specification of Figs. 1 to 9 and therefore further description of the circuit per se is not deemed necessary.

Figure 8:
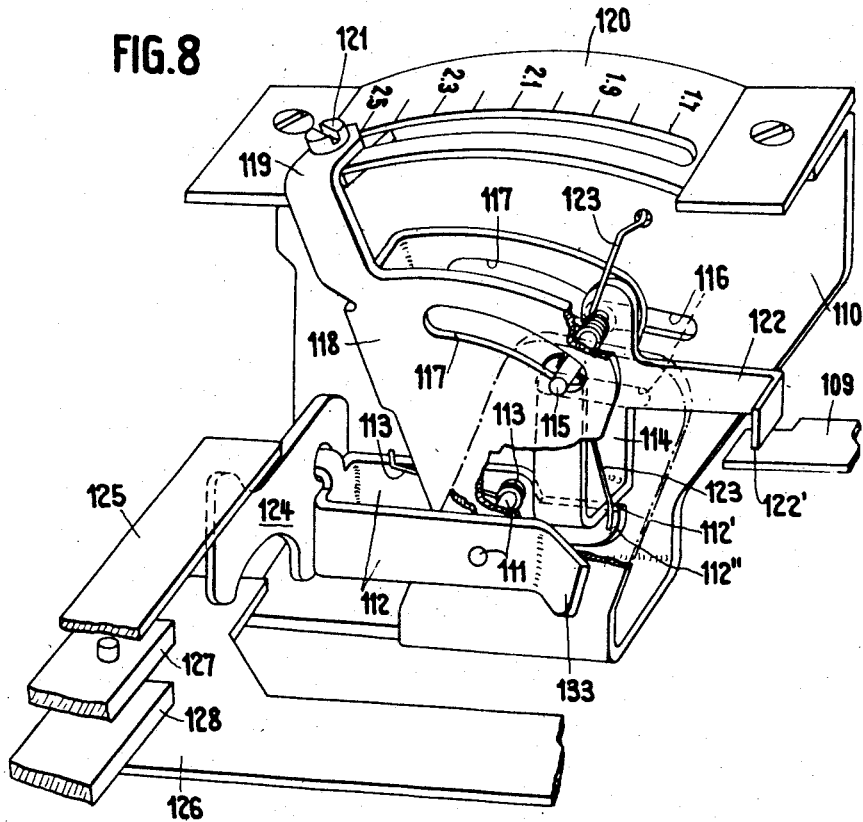
Fig. 8 is a perspective view of the tripping and sensitivity-adjusting mechanism.
Figure 9:
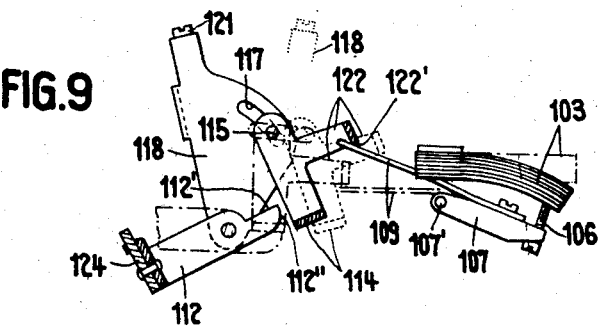
Fig. 9 is a schematic side view of the tripping and sensitivity-adjusting mechanism.

Operation of the excess-current circuit breaker is as follows:

In its normal operating condition as illustrated in Figs. 6 to 8 the main current of the consumer flows through the bimetallic releasers 103 which are thereby slightly heated in accordance with the intensity of the main current. The so heated bimetallic releasers are bent from their cold-state position shown in dash-dotted lines in Figs. 7 and 9 downwardly towards a lower position as illustrated in Fig. 9 in full lines, whereby the rocker 107 is turned in clockwise direction as seen in Figs. 7 and 9. Thereby the bimetal strip 109 is turned with the rocker 107, the end of the bimetal strip 109 engaging the control face 122' of arm 122 of the latch lever, whereby the latter is lifted and is pivoted in anticlockwise direction. During this rotation of the latch lever the lower surface of its arm 14 slides on the associated control surface 112' of the releasing part 12 towards the right in Figs. 8 and 9. However, for normal currents passing through the bimetallic releasers 103 the latch lever is not displaced to such an extent that its arm 14 leaves the control face 112' of the releasing part 112 and therefore the releasing part 112 is maintained substantially in its normal operating position as shown in Fig. 8 and in dash-dotted lines in Fig. 9. When the main current exceeds the admissible value in at least one phase, for instance due to a short circuit in the consumer, at least one of the bimetallic releasers 103 is bent downwards to such an extent that the latch lever is turned to the position shown in full lines in Fig. 9, whereby its arm 14 leaves the control face 112' of the releasing part 112. The releasing part 112 is immediately turned by spring 113 from its operating position shown in dash-dotted lines in Fig. 9 to its released position shown in full lines in Fig. 9, whereby the rest contacts 126, 128 are opened. The contactor solenoid 21 is immediately deenergized so that the main circuit is broken at the main contacts 31 of the contactor.

The main circuit of the contactor may also be broken in a similar manner by local control when the stop button 138 is depressed, the rocker 107 being thereby depressed by the arm 139 of the stop button to such an extent that arm 14 of the latch lever releases the releasing part 112, whereby the control circuit of the contactor solenoid is opened and consequently the contactor breaks the main circuit to the consumer.

After disconnection of the circuit of the consumer the bimetallic releasers 103 will cool down and will reassume their rest position for which the bimetal strip 109 returns to the position shown in dash-dotted lines in Fig. 4. Due to this return motion of the strip 109 the latch lever 114, 122 is turned back in clockwise direction in Figs. 8 and 9, whereby the control face 122' of the latch lever arm 122 is maintained in continuous contact with the strip 109, until arm 114 of the latch lever abuts against the rounded fore edge 112" of the releasing part 112. In order to close the circuit of the consumer the start button 135 is depressed, whereby the projection 133 of the releasing part 112 engaging the recess 134 of the start button 135 is moved downwardly so that the releasing part 112 is turned back in clockwise direction to the position shown in dash-dotted lines in Fig. 9. However, contact spring 126 is engaged and displaced downwardly by the extension 137 of the start button 135 at a moment at which the releasing part 112 has not yet reached a position for which closure of contacts 126, 128 is possible, and therefore closure of the contacts 126, 128 is prevented as long as the start button 135 is held in depressed position. During the above resetting rotation of the releasing part 112 the free end of the latch lever arm 114 slides along the rounded edge 112" of the releasing part 112 until arm 114 leaves the edge 112", at which moment the latch lever is released to turn back under the action of spring 123 to the position shown in dash-dotted lines in Fig. 9, in which position the latch lever arm 122 again engages the bimetal strip 109. The releasing part 112 is again latched in the position illustrated in dash-dotted lines in Fig. 4 by the latch lever arm 114. If the start button 135 is now released and is reset into its rest position by spring means not illustrated, the releasing part 112 is maintained in its loaded initial position and the contact spring 126 is released so that the contacts 126 and 128 are closed. The contactor solenoid is thus energized and the main circuit to the consumer is closed at contact bridges 31 of the contactor. By this time the excess-current tripping mechanism is in its charged position and is ready for immediately breaking the circuit when an inadmissibly high current occurs again. During the resetting operation of the tripping mechanism contacts 125 and 127 are opened and a pilot lamp 140 indicating the tripped condition is extinguished.

The current at which the contactor has to be tripped may be adjusted for instance within a range from 1.7 to 2.5 amps. as indicated by scale 120 in Fig. 8. As indicated in Fig. 8 the pointer 119 is adjusted to a tripping current of 2.5 amps., that is to the maximum possible tripping current. The adjusting member 118 is in its left end position and therefore the pivot pin 115 of the latch lever 114, 122 is located at the right end of the curved slits 117 and at the left end of the straight slits 116. Consequently the latch lever is in its extreme left end position for which position its arm 14 engages a great portion of the latching surface 112' of the releasing part 112. It is easily seen that under these conditions a substantial angular displacement of the latch lever is required for releasing the releasing part 112, in other terms, the bimetallic releasers 103 have to be bent to a high degree and the rocker 107 and the bimetal strip 109 have to be turned by an appreciable angle for rotating the latch lever to such a degree that its arm 114 releases the part 112 for tripping the device. If the tripping mechanism is required to be adjusted for smaller tripping currents the set screw 121 of the pointer 119 is loosened and the pointer is displaced to the scale division indicating the desired tripping current intensity, that is to the right in Fig. 8. Therefore the adjusting member 118 is turned in clockwise direction and the pivot pin 115 sliding in the curved slits 117 is displaced to the right along the straight stationary slots 116 because the intersecting place of slits 17 and 16 moves to the right when the adjusting member 118 is turned in clockwise direction. The latch lever is thus displaced to the right whereby its arm 122 extending in substantially horizontal direction slides along the bimetal strip 109 extending also in a substantially horizontal direction. Simultaneously arm 114 of the latch lever slides along the horizontal latching surface 112' of the releasing part 112 and therefore the latch lever is subjected to a substantially translatory displacement along the straight slits 116, the current measuring device comprising the releasers 103, the rocker 107 and the bimetal strip 109 and the releasing part 112 remaining practically in the same position during the adjustment of the latch lever. Due to the displacement of the latch lever to the right its arm 14 engages a smaller portion of the latch surface 112' of the releasing part 112 and therefore a smaller angular displacement of the latch lever of the rocker 107 and of the bimetal strip 109 respectively is required for disengaging arm 114 of the latch lever from the latching surface 112' of the releasing part 112. Therefore, the mechanism is tripped and the circuit to the consumer is broken at a smaller current according to the displacement of the latch lever. This is illustrated in Fig. 9 wherein the right-hand end position of the latch lever and of the pointer 119 is indicated in dotted lines. It is evident that for the right end position of the latch lever a much smaller angular displacement of the latter is required for disengaging the releasing part 112 than for the left end position of the latch lever shown in Fig. 4 in full and in dash-dotted lines respectively.

As will be seen from the foregoing the latch lever is translatorily displaced throughout its adjusting range without affecting the position and operating characteristics of the current measuring device and of the contacts supervised by the tripping device. The correct position of the latch lever is always maintained by the contact between its arm 122 and the bimetal strip 109. Since a similar adjusting displacement and adjusting characteristic are obtained throughout the adjusting range calibration of the tripping device is simple and reliable and the correct calibration is maintained during the whole lifetime of the tripping mechanism.

Calibration is preferably obtained by proper shaping of the slits 117 in a manner that a completely linear scale 20 is obtained. Since heating and bending of the bimetallic releasers 103 is not a strictly linear function of the current flow through such releasers, the displacement of the latch lever 14, 22 must not be proportional to the angular displacement of the pointer 119 and the adjusting member 118 respectively. However, the correct relation between the angular displacement of the adjusting member 118 and the translatory displacement of the latch lever is obtained by suitable shaping of the slits 117 which may be arranged along a circular path having its center outside the axis of pivot pin 111 of the adjusting member 118.

Of course the bimetallic releasers 103 may be replaced by solenoids connected in series with the circuit of the consumer or other thermic or magnetic releasers of well known construction.

For remote control of the contactor from one of the remote control units having each a start button 135' and a stop button 138', the excess-current circuit breaker has to be in its untripped condition as illustrated in Fig. 14. The tripping contacts actuated by the stop buttons 138' are connected in series into the self-holding circuit of the contactor solenoid 21. Therefore, when the one or other of stop buttons 138' is depressed and its associated contact is opened the contactor solenoid is deenergized and the contactor is tripped, whereby its left auxiliary contact 211 connected into the self-holding circuit is opened as illustrated in Fig. 14 so that the contactor remains tripped when the stop button 138' is released again. When one of the start buttons 135' is now depressed the contactor solenoid is again energized and a self-holding circuit is re-established at the left auxiliary contact 211 of the contactor. When the contactor is tripped by excess current as described above it cannot be closed again by remote control, because the circuit of the contactor solenoid 21 is broken at contacts 126 and 128, and therefore the tripping mechanism has to be reset by local control in the manner described above by depressing the start button 135 of the excess-current circuit breaker.

As mentioned above a unit comprising auxiliary contacts may be attached to the one side of the contactor in the manner indicated in Figs. 2 and 3. This unit which is fully illustrated in Figs. 10 to 13 has a casing 201 of insulating material and a cover 202 preferably made of a transparent insulating material such as a transparent plastic material, the cover being adapted for being screwed to the casing 1. The bottom wall of the casing has a longitudinal slot 203 and a contact carrier 204 of insulating material having a U-shaped cross section is slidably inserted into the slot 203. An actuating cam 205 (Fig. 12) of the contact carrier 204 is displaceable along a slit 206 of the casing bottom, a recess 207 of the actuating cam 205 being engaged by the control arm 41 of the contactor when the casing 201 is attached to the contactor as indicated in Figs. 2 and 3, the contact carrier 204 being longitudinally displaced in its guide slot 203 when the control arm 41 is turned during a closing or tripping operation of the contactor.

Figure 10:
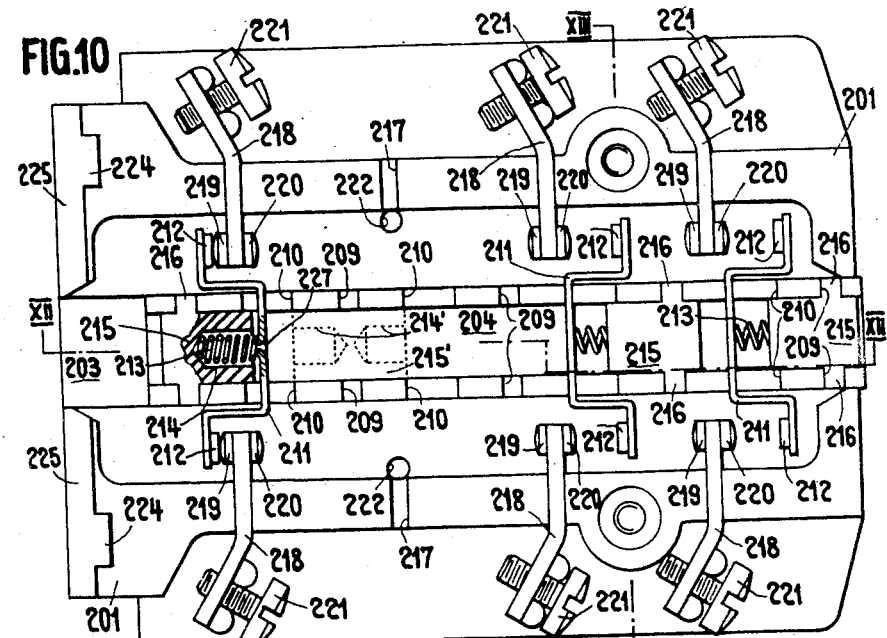
Fig. 10 is a top view of a group of contacts associated with the contactor.
Figure 11:
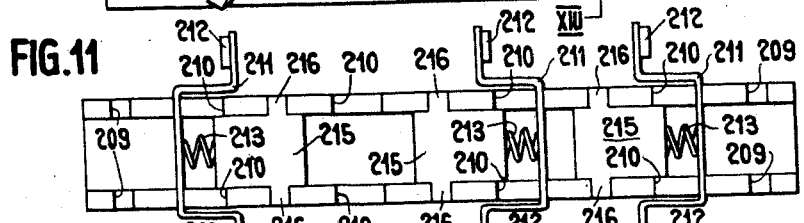
Fig. 11 is a top view of the displaceable contact carrier, the contacts supported in the contact carrier being shown in opposite operating positions in Figs. 1 and 2 respectively.

Narrow slots 209 and wide slots 210 are provided in alternating succession in the upwardly directed flanges of the contact carrier 204, pairs of narrow and wide slots being formed in both flanges at symmetrically opposite places. Contact bridges 211 of the shape shown in Figs. 10 and 11 are inserted into the wider slots 210, each of the said contact bridges having two contact pieces 212. Each of the contact bridges 211 is associated with a pressure spring 213 acting with one end against the contact bridge thereby tending to push it against the one end of the slots 210 in which it is inserted, and anchored with its other end in a bore 214 of a spring carrier 215. The spring carriers 215 have cams or ribs 216 engaging the said narrow slots 209 so that the spring carriers are secured against displacement in longitudinal or transversal direction relatively to the contact carrier 204, but may easily be removed from the contact carrier 204 in upward direction.

Stationary contacts 218 are inserted in slots 217 provided in the side walls of the casing 201, contacts 218 being secured against displacement transversally to the side walls but being easily removable by lifting them out of their anchoring slots. Each of the stationary contacts 218 has two oppositely directed contact pieces 219 and 220 respectively adapted for cooperation with the contact pieces 212 of the displaceable contact bridges 211. The stationary contacts 218 also constitute the terminals of the auxiliary-contacts unit, to which terminals the conductors of the circuits controlled by the auxiliary contacts may be attached by means of screws 221. As will be seen from Fig. 10, bores 222 are provided in the bottom wall of the casing 201 near the inner end of the anchoring slots 217 for the stationary contacts 218, an anchoring tooth 223 of the stationary contact 218 inserted into the associated slot 217 engaging the bore 222 thereby preventing displacement of the stationary contact transversally in the side wall of the casing 201.

When the cover 202 is secured to the casing portion 201 by means of anchoring lugs 224 formed on the rear wall 225 of the casing portion 201 and by means of screws 226, parts 204, 211, 213, 215 and 218 which are loosely inserted are secured in their associated supporting structures by the cover 202. However, when the cover is removed after having loosened the screws 226, the said parts loosely inserted in supporting structures may easily be removed, this possibility being of particular importance for parts 211, 213 and 215, each set of these latter parts forming a displaceable contact assembly. As shown in Fig. 10 the contact bridge 211 shown at the left end of the casing is inserted on the right of its associated spring carrier 215 so that its associated spring 213 tends to shift the contact bridge 211 to the right. When the contact carrier 204 is shifted to its extreme right end position as shown in Fig. 10 the contact pieces 212 of the said left contact bridge 211 are pressed against the contact pieces 219 of the associated stationary contacts 218 and consequently the left contact bridge 211 and the stationary contacts 218 associated therewith form a rest contact or breaking contact. The contact bridges 211 shown on the right in Fig. 10 are arranged on the left of their associated spring carriers 218 and therefore such contact bridges are pressed towards the left in Fig. 10 by their associated pressure springs 213 and are held in contact with the left boundary surfaces of the wide slots 210 in which they are inserted. As clearly illustrated in Fig. 10 the contact pieces 212 of the contact bridges 211 shown on the right are spaced from the contact pieces 220 of the associated stationary contacts 218 and consequently these contact assemblies form working or making contacts.

Figure 12:
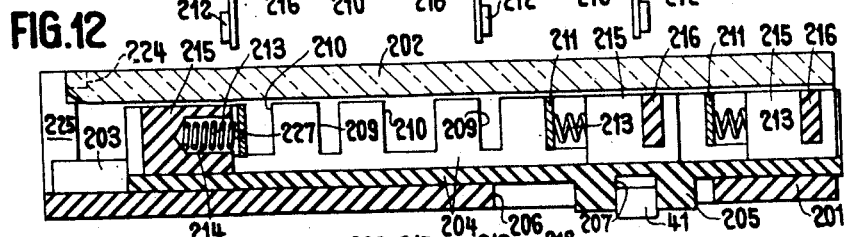
Fig. 12 is a section along line XII—XII in Fig. 10.
Figure 13:
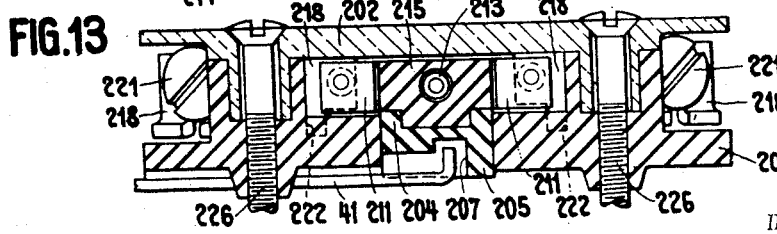
Fig. 13 is a section along line XIII—XIII in Fig. 10.

Fig. 12 is a longitudinal section showing the parts in the relative position illustrated in Fig. 10. When the contact carrier 204 is now shifted under control of the actuating arm 41 of the contactor from its right-hand end position to its left-hand end position, the contact bridge 211 shown on the left in Fig. 10 is first maintained in contact with its associated stationary contacts by its pressure spring 213, until the straight mid-portion of the contact bridge 211 abuts against the right-hand vertical boundary face of the slots 210. At this instant the left-hand contact bridge 211 is displaced to the left by the still moving contact carrier 204 and is immediately separated from its associated stationary contacts. In this way the rest contact is opened.

The contact bridges 211 shown on the right in Fig. 10 are first moved with the contact carrier 204 to the left until their contact pieces 212 abut against the contact pieces 220 of the associated stationary contacts. On further displacement of the contact carrier 204 towards the left these contact bridges remain in this operating position determined by their contact with the associated stationary contacts and the associated pressure springs 213 are further compressed. When the contact carrier 204 is again shifted back to its original position shown in Fig. 10 the contact bridges at the right end of the contact carrier will operate in the manner described above for the contact bridge at the left end of the contact carrier and vice versa.

In the auxiliary-contacts unit shown in Figs. 10 to 13 an existing working contact may very easily be converted into a rest contact and vice versa. Assuming that the working contact shown in the middle in Fig. 10 has to be converted into a rest contact, the casing cover 202 is first removed the spring carrier 215 with the spring 213 is removed from the contact carrier 204 and is reinserted into the next pair of narrow slots 209 on the left of the contact bridge 211, in a position opposite or displaced by 180° respectively to its former position, this new position being shown in Fig. 11. Subsequently the contact bridge 211 is turned by 180° in the same pair of wide mounting slots 210 into the position shown in Fig. 11, from which figure it is easily seen that this contact bridge will now operate as a rest contact as shown on the left in Fig. 10. In Fig. 11 the position and operation of all the contact bridges is opposite to the operating position shown in Fig. 10. For conversion of a rest contact into a working contact the procedure is analogous in that the contact bridge 211 is turned by 180° in its pair of wide mounting slots 210 while the associated spring carrier 215 is also turned by 180° into an opposite position and is inserted in a pair of narrow mounting slots 209 on the opposite side of the contact bridge 211. Fig. 11 also shows the contact bridge at the left end of the contact carrier 204 converted to a working contact.

In this simple way it will always be possible by suitably arranging the contact bridges 211 and the carriers 215 with the springs 213 to form any desired combination of working and rest contacts of the four contact assemblies disposable in the auxiliary-contact unit shown in Figs. 10 to 13. Since the cover 202 of the casing is made of a transparent material it will always be possible without opening the casing to verify where the rest contacts and where the working contacts have been formed and to connect the electric control circuits accordingly.

Manufacture of the auxiliary-contacts unit is very economical because all its parts may be cast or pressed of plastic material or stamped from sheet metal, whereby the removable parts of the unit are loosely held between casing portion 201 and casing cover 202. It may be an advantage to attach the pressure springs 213 either to the associated spring carriers 215 or to the associated contact bridges 211 or to both parts in order to prevent loss of the pressure spring during conversion of the contacts and in order to facilitate conversion of the contacts. For anchoring the pressure springs 213 on the associated contact bridges 211 the latter may comprise instead of a slight embossing as shown on the left contact bridge 211 in Fig. 10 and serving for securing the springs 213 on the surface of the contact bridges, larger portions stamped out of the contact bridge to which the pressure spring 213 may firmly be secured.

It is a further advantage of the contact assemblies shown in Figs. 10 to 13 that practically rigid contact bridges 211 associated with actuating springs 213 are used. This arrangement makes it possible to exactly adjust the operating point of each contact by slightly bending the extremities of the contact bridges 211. The so adjusted operating points will not change subsequently as is the case with contact bridges of resilient material. However, this invention is not limited to rigid contact bridges and resilient contact springs might also be used in which case the spring carriers 215 and the pressure springs 213 may be dispensed with, it being only required to insert the resilient contacts in the one or other position into suitable mounting means of the contact carrier 204 for forming either a working or a rest contact. With such an arrangement the stationary contacts may be resilient contact springs while the displaceable contacts may be rigid contact bridges, or resilient contact springs may be provided for both stationary and displaceable contacts. The position of the stationary contacts only may be adjustable for changing the operation of the contact assembly.

In the embodiment of the auxiliary-contact unit shown in Fig. 10 spring carriers 215' may be provided mounted between adjacent pairs of wider mounting slots 210 and having two symmetrically arranged bores 214'. For forming working and rest contacts respectively a contact bridge 211 assembled with a pressure spring 213 in the manner set out above may be inserted into a pair of wide slots 210 in the one or other direction and on the one or other side of the spring carrier 215' according to whether a working or a rest contact is to be formed.

Means may also be provided allowing a continuous or stepwise adjustment of the stationary or displaceable contacts in their contact carriers in a direction parallel to the displacement of the contact carrier 204 so that each contact assembly may be adjusted to operate as a working contact or a rest contact and for each of such operations the operating point of the contact assembly may be adjusted as desired by additional displacement of the adjustable contacts. For instance the mounting slots 217 in the side walls of the casing 201 may be arranged at much smaller distances so that the position of the stationary contacts 218 may be stepwise adjusted by inserting such contacts into the one of a group of closely spaced mounting slots 217 for which the desired operating point of the contact assembly is obtained.

Of course more or less than four contact assemblies may be provided.

While I have described and illustrated one embodiment of my invention, I do not wish to unnecessarily limit the scope thereof, but reserve the right to make such modifications and rearrangements of the several parts as may come within the purview of the accompanying claims.

What I claim is:

1. A contactor associated with an excess-current circuit-breaker comprising a tripping device having an operating position and a tripped position, a current measuring device and a pivotable latch lever operatively associated with the said tripping device and controlled by the current measuring device, a normal-current position for the said latch lever for which the said tripping device is held in its operating position and an excess-current position for the said latch lever for which the said tripping device is released into its tripped position, the said latch lever having a first control surface cooperating with the said current measuring device and a second control surface cooperating with the said tripping device, the said first and second control surfaces executing at least approximately mutually perpendicular motions when the said latch lever is turned by the said current measuring device, an adjusting range for the said latch lever and adjusting means associated with the said latch lever adapted for translatorily displacing the said latch lever in a direction perpendicular to the operating displacement and in the plane of the said first control surface, the angular position of the said latch lever being continuously determined throughout the said adjusting range by the engagement between the said first control surface and the current measuring device.

2. A contactor according to claim 1, wherein the said latch lever has two mutually perpendicular arms having each one of the said first and second control surfaces, the said adjusting means being adapted to displace the pivot pin of the said latch lever, comprising a control member in the said current measuring device, having an elongated control surface extending substantially in the direction of the said latch lever arm having the said first control surface and the said latch lever being displaceable substantially in the direction of the said elongated control surface when displaced by the said adjusting means so that no relative operating motion occurs between the said current measuring means and the said latch lever during adjustment of the latch lever.

3. A contactor according to claim 2, comprising a stationary support for the said latch lever, having straight slits, and pivotable adjusting member having slits, the said pivot axis of the latch lever extending through the said slits and its position being determined by the intersecting place of the said slits of the stationary support and the adjusting member respectively.

4. A contactor according to claim 3, the said straight slits of the stationary support extending in a direction parallel to the direction of the latch lever arm cooperating with the current measuring device.

5. A contactor according to claim 3, the said adjusting member being pivoted round an axis and its slits being arranged at least approximately along a circular line having its center outside the pivot axis.

6. A contactor according to claim 3, comprising a scale cooperating with the said adjusting member and being linearly graduated in values of the current at which the said tripping member is required to be tripped.

7. A contactor, associated with an excess-current circuit-breaking device, comprising a platelike bottom contact carrier and a platelike top contact carrier for supporting fixed contacts and a displaceable contact carrier between the said top and bottom contact carriers, means for attaching the contactor on a supporting structure with its bottom contact carrier adjacent the said supporting structure, the said excess-current circuit-breaking device having contact means, a current measuring system and terminals, contact means on the said top contact carrier, fixing means on the said top contact carrier and on the said excess-current circuit-breaking device for removably attaching the said excess-current circuit-breaking device on the said top contact carrier, the said contact means on the top contact carrier engaging the said contact means of the excess-current circuit-breaking device when the excess-current circuit-breaking device is attached to the contactor thereby forming a disengageable plug connection.

8. A contactor comprising a carrying frame made for instance of sheet metal and having top and bottom portions and side portions, two platelike supports of insulating material for fixed contacts and for terminals attached spaced from each other to the said top and bottom portions respectively of the said frame, the said side portions of the frame and the said platelike supports enclosing a canal-shaped space of substantially rectangular cross section, a displaceable support of insulating material for movable contacts, guide surfaces on the said frame for the said displaceable support, an operating solenoid at one end of the said canal-shaped space and resetting means associated with the said displaceable support, the said displaceable support being displaceable in the said canal-shaped space by the said solenoid and resetting means respectively thereby being translatorily guided in the said guide means of the frame.

9. A contactor according to claim 8, comprising stop means at the end opposite the said solenoid of the said canal-shaped space, pivotably mounted on the said frame for being shifted into an effective and an ineffective position, an operating position and a rest position for the said displaceable contact support, the said stop means engaging the said displaceable contact support in its rest position when in effective position and the said stop means allowing retraction of the said displaceable contact support from the said canal-shaped space when in their ineffective position.

10. A contactor according to claim 8, comprising an operating electromagnet having a coil body carrying an exciting winding and a magnet core mounted in the said coil body, the said coil body being loosely and removable inserted into the said frame, the said magnet core being attached to the coil body but not to the frame.

11. A contactor comprising a bar-shaped displaceable contact carrier of insulating material having a substantially U-shaped cross section, side flanges enclosing a longitudinal slot being formed in the said contact carrier, recesses in the said flanges, contact bridges and fixed contacts adapted for coaction with the contact bridges, springs for loading the said contact bridges and supporting pieces for the said springs, the said recesses being adapted for loosely and removably receiving the said contact bridges and supporting pieces respectively and the said recesses allowing longitudinal displacement of the said contact bridges in the contact carrier, one contact bridge, one supporting piece and a spring inserted between the contact bridge and the supporting piece forming a contact unit, a first and second position of the said contact bridges in the said contact carrier and a first and second position of the said supporting pieces and springs relative to their associated contact bridge, a rest contact or a working contact being formed by the said contact bridges according to whether such contact bridges and the said supporting pieces associated therewith are in their said first or second position, changing of the position of the said contact bridges and supporting pieces associated therewith being facilitated by the loose and removable insertion thereof into the said recesses of the contact carrier.

12. A contactor comprising a displaceable contact carrier, recesses at one side of the contact carrier, contact bridges and fixed contacts adapted for cooperation with the contact bridges, springs for loading the said contact bridges and supporting pieces for the said springs, the said recesses of the contact carrier being adapted for loosely and removably receiving the said contact bridges and supporting pieces respectively and the said recesses allowing longitudinal displacement of the said contact bridges in the contact carrier, one contact bridge one supporting piece and a spring inserted between the contact bridge and the supporting piece forming a contact unit, a first and second position of the said contact bridges in the said contact carrier and a first and second position of the said supporting pieces and springs relative to their associated contact bridge, a rest contact or a working contact being formed by the said contact bridges according to whether such contact bridges and the said supporting pieces associated therewith are in their said first or second position, changing of the position of the said contact bridges and supporting pieces associated therewith being facilitated by the loose and removable insertion thereof into the said recesses of the contact carrier.

References Cited in the file of this patent

UNITED STATES PATENTS

| | | |
|---|---|---|
| 2,106,581 | Unwin | Jan. 25, 1938 |
| 2,371,601 | Beeman | Mar. 20, 1945 |
| 2,496,178 | Schleicher | Jan. 31, 1950 |
| 2,532,305 | Heller | Dec. 5, 1950 |
| 2,687,458 | Cobb et al. | Aug. 24, 1954 |
| 2,687,502 | Furnas et al. | Aug. 24, 1954 |
| 2,721,963 | Knight | Oct. 25, 1955 |
| 2,794,882 | Russell | June 4, 1957 |